(12) United States Patent  
Fang (10) Patent No.: US 9,467,076 B2
(45) Date of Patent: Oct. 11, 2016

(54) POSITION LIMITING DEVICE AND CONTROL METHOD

(71) Applicant: DELTA ELECTRONICS, INC., Taoyuan Hsien (TW)

(72) Inventor: Pin-Hao Fang, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 431 days.

(21) Appl. No.: 14/093,641

(22) Filed: Dec. 2, 2013

(65) Prior Publication Data

US 2014/0346996 A1 Nov. 27, 2014

(30) Foreign Application Priority Data

May 21, 2013 (CN) .......................... 2013 1 0190489

(51) Int. Cl.
*G05D 3/12* (2006.01)
*H02P 3/06* (2006.01)

(52) U.S. Cl.
CPC ...................................... *H02P 3/06* (2013.01)

(58) Field of Classification Search
CPC .................................. H02P 3/06; G05D 3/12
USPC .......................... 318/626, 560, 450, 449, 445
See application file for complete search history.

(56) References Cited

U.S. PATENT DOCUMENTS

| | | | | |
|---|---|---|---|---|
| 5,038,087 A * | 8/1991 | Archer | ...................... | E06B 9/88 160/310 |
| 6,215,263 B1 * | 4/2001 | Berkowitz | ............. | H01H 33/36 307/139 |
| 7,599,612 B2 * | 10/2009 | Moseley | ................... | E06B 9/68 160/310 |
| 8,089,249 B2 | 1/2012 | Zhang et al. | | |
| 2005/0184599 A1 * | 8/2005 | Culpi | ....................... | H02K 7/06 310/12.19 |
| 2005/0197650 A1 * | 9/2005 | Sugimoto | ............... | A61M 5/20 604/890.1 |
| 2008/0265826 A1 * | 10/2008 | Sasaki | ................... | G01D 5/2013 318/687 |
| 2009/0325280 A1 * | 12/2009 | Osawa | .................... | C12M 23/48 435/288.7 |
| 2010/0242693 A1 * | 9/2010 | Akiyama | ............... | B23Q 17/09 82/118 |
| 2013/0207584 A1 * | 8/2013 | Duits | ................... | F16H 25/2015 318/468 |

FOREIGN PATENT DOCUMENTS

| | | |
|---|---|---|
| CN | 200941127 Y | 8/2007 |
| CN | 201037448 Y | 3/2008 |

* cited by examiner

*Primary Examiner* — Kawing Chan
(74) *Attorney, Agent, or Firm* — Hauptman Ham, LLP (57) ABSTRACT

A position limiting device includes a magnetic element, a detecting element, a motor, and a controller. The magnetic element is disposed in the center of the position limiting device, the motor is coupled to the detecting element, and the controller is electrically coupled to the detecting element and the motor. The detecting element is configured to detect magnetic fields generated by the magnetic element, and correspondingly generate and transmit a magnetic field intensity signal. The controller is configured to receive and process the magnetic field intensity signal to obtain a magnetic field intensity value. In addition, the controller is further configured to compare the magnetic field intensity value and a magnetic field intensity boundary value. When the magnetic field intensity value is less than the magnetic field intensity boundary value, the controller drives the motor so that the motor makes the detecting element to move correspondingly to the magnetic element.

20 Claims, 3 Drawing Sheets

POSITION LIMITING DEVICE AND CONTROL METHOD

RELATED APPLICATIONS

This application claims priority to Chinese Application Serial Number 201310190489.9, filed May 21, 2013, which is herein incorporated by reference.

BACKGROUND

1. Field of Invention

The present disclosure generally relates to a device and a method, and especially relates to a position limiting device and a control method.

2. Description of Related Art

In a traditional moving module, a boundary position limiting device is configured for preventing a motor from rotating beyond a boundary which results in a gear or other mechanisms jammed or damaged.

The implementation of the boundary position limiting device mentioned above includes several ways. First, a position limiting switch is disposed on the boundary of the moving module. Therefore, when the motor drives the moving module to move and the position limiting switch is pressed by the mechanism, the motor stops rotating. Second, a detecting and controlling method is performed by software. When an electrode is touched by a metal mechanism of the moving module, the motor stops rotating.

However, two position limiting switches or electrodes are disposed on every axis in a traditional position limiting device. It results in the wires inside the moving module being complicated. Therefore, when the motor drives the moving module to move, it easily causes the wires being dragged and even causes the wires being disconnected. Accordingly, it is difficult to maintain the moving module with boundary position limiting device.

Especially, when the position limiting switches or electrodes of the boundary position limiting device described above are failed or damaged, the boundary position limiting device is out of function. At this time, the motor will not accurately drive the moving module.

Obviously, some inconvenience and disadvantage still exist in the device mentioned above to be improved. To solve the issue above, people in the art make a great effort to find out the solution. Unfortunately, the proper solution is not developed till now.

SUMMARY

The summary provides the simplified description of this disclosure, so that the reader may understand the basic principle of this disclosure. The summary is not the completed overview of this disclosure. The summary is not intended to indicate the important/crucial component of embodiments of the present disclosure or limit the scope of this disclosure.

The purpose of the summary is to provide a position limiting device so that the existing issue in the prior art is improved.

In order to accomplish the purpose above, a technical aspect of this disclosure is related to a position limiting device, which includes a magnetic element, a detecting element, a motor and a controller. In structure, the magnetic element is disposed in the center of the position limiting device. The motor is coupled to the detecting element, and the controller is electrically coupled to the detecting element and the motor.

In operation, the detecting element is configured to detect a magnetic field generated by the magnetic element, and correspondingly generate and transmit a magnetic field intensity signal. The motor is configured to drive the detecting element to move, and the controller is configured to receive and process the magnetic field intensity signal to obtain a magnetic field intensity value. Furthermore, the controller is further configured to compare the magnetic field intensity value and a magnetic field intensity boundary value. When the magnetic field intensity value is smaller than the magnetic field intensity boundary value, the controller drives the motor and the detecting element moves related to the magnetic element by the driving of the motor. When the magnetic field intensity value is equal to the magnetic field intensity boundary value, the controller stops the operation of the motor so that the detecting element stops moving.

According to one embodiment of this disclosure, the magnetic element described above includes a first end and a second end, wherein the controller is further configured to control the motor, the detecting element is correspondingly moved from the first end to the second end by the driving of the motor to perform a correction of rotation number boundary value. When the correction of the rotation number boundary value is performed, the rotation number of the motor is read by the controller, and a rotation number boundary value is calculated from the rotation number.

According to another embodiment of this disclosure, when the controller is unable to receive the magnetic field intensity signal, the controller reads the rotation number of the motor, and compares the rotation number and the rotation number boundary value. When the rotation number is equal to or larger than the rotation number boundary value, the controller stops the operation of the motor so that the detecting element stops moving.

According to further another embodiment of this disclosure, the rotation number boundary value includes a first rotation number boundary value and a second rotation number boundary value, the correction of rotation number boundary value includes a correction of the first rotation number boundary value and a correction of the second rotation number boundary value. When the detecting element is correspondingly moved from the first end to the second end, the controller reads the rotation number of the motor, and the first rotation number boundary value is calculated from the rotation number.

According to yet another embodiment of this disclosure, when the controller is unable to receive the magnetic field intensity signal, the controller reads the rotation number of the motor, and compares the rotation number and the first rotation number boundary value, wherein the direction from the first end to the second end is defined as a first direction. When the detecting element is correspondingly moved from the center of the position limiting device along the first direction, and the rotation number is equal to or larger than the first rotation number boundary value, the controller stops the operation of the motor so that the detecting element stops moving.

According to another embodiment of this disclosure, when the detecting element is correspondingly moved from the second end to the first end, the controller reads the rotation number of the motor, and the second rotation number boundary value is calculated from the rotation number.

According to further another embodiment of this disclosure, when the controller is unable to receive the magnetic field intensity signal, the controller reads the rotation number of the motor, and compares the rotation number and the second rotation number boundary value, wherein the direction from the second end to the first end is defined as a second direction. When the detecting element is correspondingly moved from the center of the position limiting device along the second direction and the rotation number is equal to or larger than the second rotation number boundary value, the controller stops the operation of the motor so that the detecting element stops moving.

According to yet another embodiment of this disclosure, after the correction of the rotation number boundary value is performed, and when the detecting element moves from the center of the position limiting device related to the magnetic element, and the magnetic field intensity value is equal to the magnetic field intensity boundary value, the controller resets the rotation number boundary value according to the rotation number of the motor read by the controller.

According to another embodiment of this disclosure, the controller is further configured to output a rotation number signal to an external screen according to the rotation number of the motor read by the controller, so that the detecting element is displayed in a relative position of the position limiting device on the external screen.

According to further another embodiment of this disclosure, the rotation number boundary value is the rotation number.

According to another embodiment of this disclosure, the rotation number boundary value is the difference between the rotation number and a predetermined rotation number.

In order to accomplish the purpose above, another technical aspect of this disclosure is related to a control method, configured to control a position limiting device, wherein the position limiting device includes a magnetic element and a detecting element. The control method includes following steps: detecting a magnetic field generated from the magnetic element, and correspondingly generating and transmitting a magnetic field intensity signal by the detecting element; receiving and processing the magnetic field intensity signal to obtain a magnetic field intensity value; comparing the magnetic field intensity value and a magnetic field intensity boundary value; driving the detecting element to move related to the magnetic element when the magnetic field intensity value is smaller than the magnetic field intensity boundary value; and stopping the detecting element continued moving when the magnetic field intensity value is equal to the magnetic field intensity boundary value.

According to one embodiment of this disclosure, the magnetic element includes a first end and a second end. The control method further includes the following step: driving the detecting element to correspondingly move from the first end to the second end to perform a correction of the rotation number boundary value, wherein when the correction of the rotation number boundary value is performed, a rotation number of the motor is read and a rotation number boundary value is calculated from the rotation number.

According to another embodiment of this disclosure, when the magnetic field intensity signal is unable to be received, the rotation number of the motor is read and the rotation number and the rotation number boundary value are compared. When the rotation number is equal to or larger than the rotation number boundary value, the detecting element is stopped moving.

According to further another embodiment of this disclosure, the rotation number boundary value includes a first rotation number boundary value and a second rotation number boundary value, and the correction of the rotation number boundary value includes a correction of the first number rotation boundary value and a correction of the second rotation number boundary value. When the detecting element is correspondingly moved from the first end to the second end, the rotation number of the motor is read, and the first rotation number boundary value is calculated from the rotation number.

According to yet another embodiment of this disclosure, when the magnetic field intensity signal is unable to be received, the rotation number of the motor is read, and the rotation number and the first rotation number boundary value are compared, wherein the direction from the first end to the second end is defined as a first direction. When the detecting element is correspondingly moved from the center of the position limiting device along the first direction, and the rotation number is equal to or larger than the first rotation number boundary value, the detecting element is stopped moving along the first direction.

According to another embodiment of this disclosure, when the detecting element is correspondingly moved from the second end to the first end, the rotation number of the motor is read, and the second rotation number boundary value is calculated from the rotation number.

According to further another embodiment of this disclosure, when the magnetic field intensity signal is unable to be received, the rotation number of the motor is read, and the rotation number and the second rotation number boundary value are compared, wherein the direction from the second end to the first end is defined as a second direction, and when the detecting element is correspondingly moved from the center of the position limiting device along the second direction, and the rotation number is equal to or larger than the second rotation number boundary value, the detecting element is stopped moving along the second direction.

According to yet another embodiment of this disclosure, after the correction of the rotation number boundary value is performed, and when the detecting element moves from the center of the position limiting device related to the magnetic element, and the magnetic field intensity value is equal to the magnetic field intensity boundary value, the rotation number boundary value is reset according to the rotation number of the motor read by the controller.

According to another embodiment of this disclosure, the control method further includes the following step: outputting a rotation number signal to an external screen according to the rotation number of the motor read by the controller, so that the detecting element is displayed in a relative position of the position limiting device on the external screen.

Therefore, according to the content of this disclosure, the embodiments of this disclosure provide a position limiting device and a control method to improve the issue in the prior art. For example, a traditional position limiting device is configured with two position limiting switches or electrodes on every axis. It results in the wires inside the moving module being complicated. Besides, a position limiting device and a control method provided by the embodiments of the disclosure further improve the issues which the boundary position limiting device is out of function and the motor is unable to accurately drive the moving module, owing to the failure or damage of the position limiting switches or the electrodes of the boundary position limiting device.

After the following embodiments are taken as reference, those of skills in the art will readily understand the basic principles and objects of the present disclosure, and the technical methods and implemented aspects adopted by this disclosure.

BRIEF DESCRIPTION OF THE DRAWINGS

The disclosure can be more fully understood by reading the following detailed description of the embodiment, with reference made to the accompanying drawings as follows.

The features and components in the drawings are not depicted to scale. The drawings show the specific features and components of the present disclosure in the best way. Moreover, in the drawings, the same or similar reference numerals are used to indicate the same or similar components/parts.

DETAILED DESCRIPTION

Illustrative descriptions of the aspects and specific embodiments are provided to make the descriptions of the disclosure more precisely and completely. However, they are not the only method to implement or apply the specific embodiments of the disclosure. The implementation methods include the features of specific embodiments, and the steps and the sequences thereof used to build and operate the embodiments. However, other specific embodiments can also be used to achieve the same or equivalent functions and steps.

Unless otherwise defined in the specification, the scientific and technical terms used in this specification generally have their ordinary meanings in the art and in the specific context where each term is used. Furthermore, without conflict in the content, the term of the single form is tended to include the plural form. Also, the term of the plural form is tended to include the single form.

Besides, the term "couple" or "connect" used in the specification indicates that two or more elements are in direct physical or electrical contact with each other, or may also mean that two or more elements may be in indirect physical or electrical contact with each other, or cooperate or interact with each other.

Figure 1:
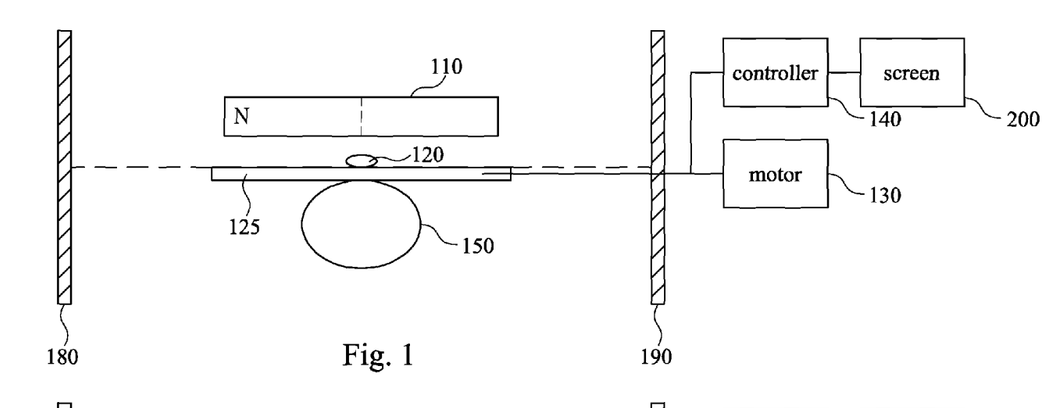
FIG. 1 shows a schematic diagram of a position limiting device according to one embodiment of this disclosure.

FIG. 1 shows a schematic diagram of a position limiting device according to one embodiment of this disclosure. As shown in FIG. 1, the position limiting device is used in a position limiting device of a camera module. The position limiting device includes a magnetic element 110, a detecting element 120, a motor 130 and a controller 140. In the view of structure, the magnetic element 110 is disposed in the center of the position limiting device. The motor 130 is coupled to the detecting element 120. The controller 140 is electrically coupled to the detecting element 120 and the motor 130. In more detail, the controller 140 may be electrically coupled to the detecting element 120 through the detecting board 125. Besides, the camera lens 150 may be coupled to the detecting element 120.

In operation, the magnetic element 110 may be a soft magnet, a rigid magnet or the like, and the shape can be configured according to the actual requirement. For example, the magnetic element 110 is configured to a strip shape. However, the shape or the kind of the magnetic element 110 described above is not intended to limit the scope of this disclosure. A person skilled in the art may selectively adopt any proper kinds or shapes to perform the magnetic element 110 according to the actual requirement.

Since the magnetic field varies according to the distance and the position of the magnetic element 110, based on the characteristics of the magnetic element 110 mentioned above, a detecting element 120 is configured in the position limiting device in the present disclosure. The detecting element 120 is configured to detect the magnetic field generated by the magnetic element 110 so that the distance and the position between the detecting element 120 and the magnetic element 110 are determined. The detecting element 120 correspondingly generates and transmits a magnetic field intensity signal to the controller 140. The controller 140 is configured to receive and process the magnetic field intensity signal to obtain a magnetic field intensity value. Since the camera lens 150 may be coupled to the detecting element 120, the camera lens 150 may be moved with the detecting element 120. When the controller 140 obtains the magnetic field intensity value, the controller 140 may drive the motor 130 according to the magnetic field intensity value. The motor 130 drives the detecting element 120 to move so that the camera lens 150 coupled to the detecting element 120 is driven to move as well. The control method of the controller 140 will be described in more detail as following.

Specifically, the controller 140 may compare the magnetic field intensity value and a predetermined magnetic field intensity boundary value, wherein the magnetic field intensity boundary value is the magnetic field intensity value read by the detecting element 120 when the detecting element 120 moves to S end or N end of the magnetic element 110. When the magnetic field intensity value is smaller than the magnetic field intensity boundary value, the controller 140 may drive the motor 130. The detecting element 120 moves related to the magnetic element 110 by the driving of the motor 130 so that the camera lens 150 is driven to move with the detecting element 120. When the controller 140 determines that the magnetic field intensity value is equal to the magnetic field intensity boundary value, the controller 140 stops the operation of the motor 130 so that the detecting element 120 and the camera lens 150 stop moving. Therefore, the detecting element 120 may not move beyond the first boundary 180 or the second boundary 190 so that the camera lens 150 may not move beyond the first boundary 180 or the second boundary 190 as well.

Figure 2:
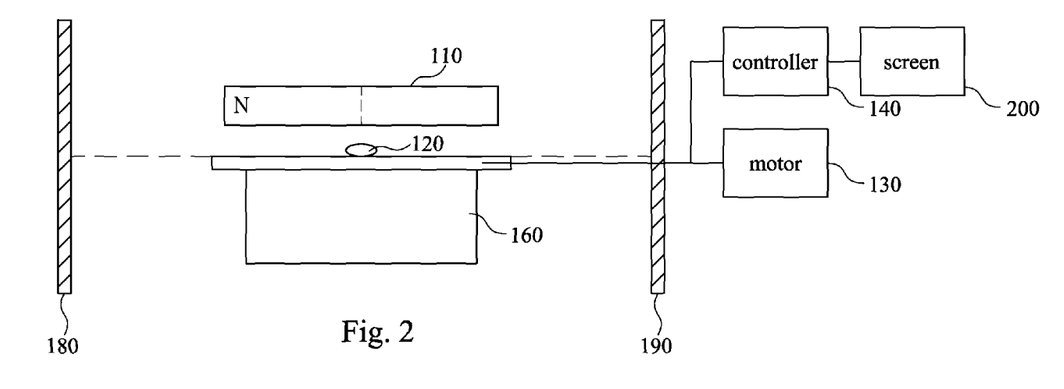
FIG. 2 shows a schematic diagram of a position limiting device according to another embodiment of this disclosure.

Furthermore, in another embodiment, FIG. 2 shows a schematic diagram of a position limiting device according to another embodiment of this disclosure. Comparing with FIG. 1, the position limiting device shown in FIG. 1 is used in a camera module, the position limiting device shown in FIG. 2 is used in an electric six-axis device. The major difference between FIG. 1 and FIG. 2 is that the detecting element 120 in FIG. 1 is coupled to the camera lens 150 and the detecting element 120 in FIG. 2 is coupled to an engine 160. However, the operation of the position limiting device in FIG. 2 is the same as that of the position limiting device in FIG. 1. When the controller 140 determines the magnetic field intensity value is equal to the magnetic field intensity boundary value, the controller 140 stops the operation of the motor 130 so that the detecting element 120 and the engine 160 stop moving. Therefore, the detecting element 120 may not move beyond the first boundary 180 or the second boundary 190 so that the engine 160 may not move beyond the first boundary 180 or the second boundary 190 as well.

Accordingly, comparing with the conventional technology, a conventional boundary position limiting device is configured with two position limiting switches or electrodes on every axis, the position limiting device in the embodiment of this disclosure is only configured with a magnetic element 110 and a detecting element 120. Relatively, the wires inside the position limiting device in the embodiment of this disclosure are simpler so that the maintenance becomes easier. Besides, the object of controlling the camera lens 150 and the engine 160 not exceeding the boundaries is accomplished as well.

The control method mentioned above is defined as a first control method. In addition to the first control method, a second control method for the position limiting device is provided in some embodiment of this disclosure. When the magnetic element 110 is lost or the detecting element 120 is out of function or damaged, that is, when the first control method is failed, the second control method is further used to ensure that the camera lens 150 or the engine 160 will not exceed the boundaries. The second control method will be described in more detail as following.

Figure 3A:
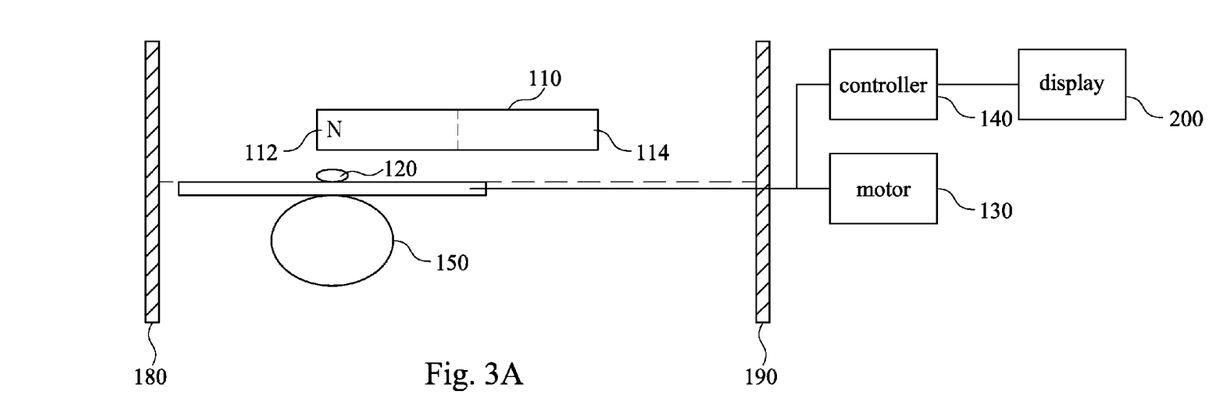
FIG. 3A shows an operation diagram of a position limiting device in FIG. 1.
Figure 3B:
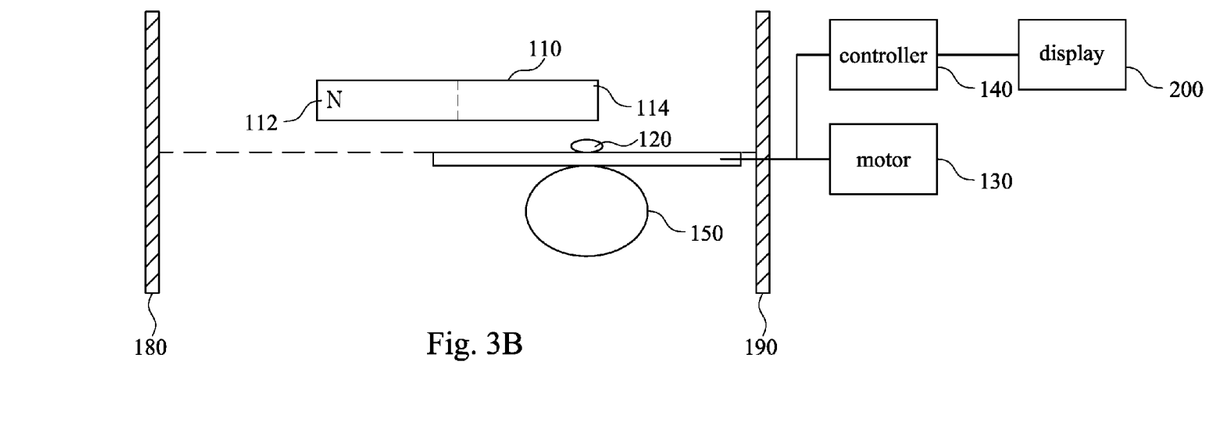
FIG. 3B shows an operation diagram of a position limiting device in FIG. 1.

In one embodiment, FIG. 3A and FIG. 3B respectively show operation diagrams of a position limiting device in FIG. 1. As shown in FIG. 3A and FIG. 3B, the magnetic element 110 includes the first end 112 and the second end 114. First, the obtain method of the initial condition of the second control method is illustrated. The controller 140 controls the motor 130. The detecting element 120 moves from the first end 112 (shown in FIG. 3A) to the second end 114 (shown in FIG. 3B) by the driving of the motor 130 to perform the correction of rotation number boundary value. When the correction of rotation number boundary value is performed, the rotation number of the motor 130 is read by the controller 140, and the rotation number boundary value (the initial condition in the second control method) is calculated from the rotation number.

In one embodiment, when the correction of rotation number boundary value is performed, the rotation number boundary value is the rotation number of the motor 130. For example, when the correction of rotation number boundary value is performed, the motor rotates 5000 revolutions. Thus, the rotation number boundary value is 5000. In another embodiment, when the correction of rotation number boundary value is performed, the rotation number boundary value is the difference between the rotation number of the motor 130 and a predetermined rotation number. For example, when the correction of rotation number boundary value is performed, the motor rotates 5000 revolutions. At this time, 5000 minus 2 (predetermined rotation number) is 4998. Therefore, the rotation number boundary value is 4998.

The second control method is illustrated as following. After the rotation number boundary value is obtained, if the magnetic element 110 is lost or the detecting element 120 is out of function or damaged, the controller 140 is unable to receive the magnetic field intensity signal. At this time, the controller 140 reads the rotation number of the motor 130 and compares the rotation number and the rotation number boundary value. When the rotation number is larger than or equal to the rotation number boundary value, the controller 140 stops the operation of the motor 130 so that the detecting element 120 stops moving. Thus, the camera lens 150 or the engine 160 stops moving as well.

In this way, even when the magnetic element 110 is lost or the detecting element 120 is out of function or damaged, that is, when the first control method is out of function, the movement of the camera lens 150 or the engine 160 can still be accurately controlled by the second control method in the embodiment of the disclosure.

Besides, since the detecting element 120 may correspondingly move to the first end 112 or the second end 114 of the magnetic element 110, the position limiting device may have two boundaries and respectively set two boundary values. In other words, the rotation number boundary values may include the first rotation number boundary value and the second rotation number boundary value. Furthermore, in order to make the control of the position limiting device more accurately, it is necessary to respectively perform the correction of the two boundary values. That is, the correction of rotation number boundary value includes the correction of the first rotation number boundary value and the correction of the second rotation number boundary value. When the detecting element 120 moves from the first end 112 (shown in FIG. 3A) to the second end 114 (shown in FIG. 3B), the controller 140 reads the rotation number of the motor 130 and the first rotation number boundary value is calculated from the rotation number.

Similarly, if the magnetic element 110 is lost or the detecting element 120 is out of function or damaged, the controller 140 is unable to receive the magnetic field intensity signal. At this time, the controller 140 reads the rotation number of the motor 130 and compares the rotation number and the first rotation number boundary value. The direction from the first end 112 to the second end 114 is defined as a first direction. When the detecting element 120 is correspondingly moved from the center of the position limiting device along the first direction, and the rotation number is larger than or equal to the first rotation number boundary value, the controller 140 stops the operation of the motor 130 so that the detecting element 120 stops moving. Then, the camera lens 150 or the engine 160 stops moving as well.

Furthermore, When the detecting element 120 moves from the second end 114 (shown in FIG. 3B) to the first end 112 (shown in FIG. 3A), the controller 140 reads the rotation number of the motor 130 and the second rotation number boundary value is calculated from the rotation number.

Similarly, if the magnetic element 110 is lost or the detecting element 120 is out of function or damaged, the controller 140 is unable to receive the magnetic field intensity signal. At this time, the controller 140 reads the rotation number of the motor 130 and compares the rotation number and the second rotation number boundary value. The direction from the second end 114 to the first end 112 is defined as a second direction. When the detecting element 120 correspondingly moves from the center of the position limiting device along the second direction, and the rotation number is larger than or equal to the second rotation number boundary value, the controller 140 stops the operation of the motor 130 so that the detecting element 120 stops moving. Then, the camera lens 150 or the engine 160 stops moving as well.

Since the motor 130 may be worn after operated for a period of time, if the rotation number boundary value obtained from the correction of the rotation number boundary value is still in use, the rotation number boundary value may become inaccurate. Therefore, after the correction of the rotation number boundary value is performed, the rotation number boundary value can be updated in real time through a mechanism. The mechanism is described as below. When the detecting element 120 moves from the center of the position limiting device related to the magnetic element 110, and the magnetic field intensity value is equal to the magnetic field intensity boundary value, the controller 140 resets the rotation number boundary value according to the rotation number of the motor 130 read by the controller 140.

Accordingly, when the detecting element 120 moves to the boundary according to the first control method (i.e. the method of detecting the magnetic field intensity by the detecting element 120), the controller 140 resets the rotation number boundary value according to the second control method (i.e. the method based on the rotation number of the motor). Therefore, the accuracy of the control method is further improved.

Since the user may not be aware of the operation status of the position limiting device, a display mechanism is provided in this disclosure to provide the user the operation status of the position limiting device. The mechanism is described as following. The controller 140 is further configured to output a rotation number signal to an external screen 200 according to the rotation number of the motor 130 read by the controller, so that the detecting element 120 is displayed in a relative position of the position limiting device on the external screen 200. Accordingly, the user may be aware of the relative position of the camera lens 150 or the engine 160 so that the user may control the position limiting device.

Figure 4:
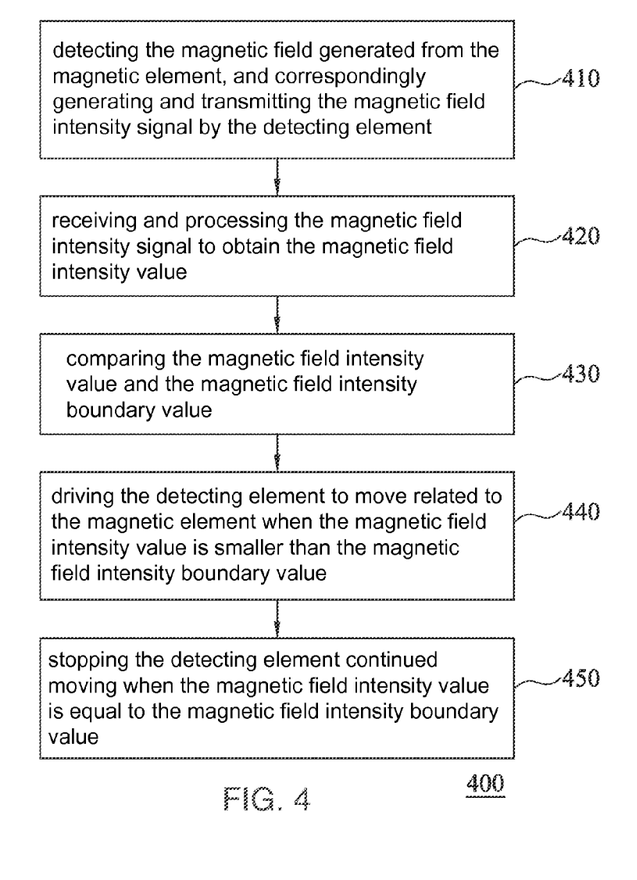
FIG. 4 shows a flow chart of a control method according to further another embodiment of this disclosure.

FIG. 4 shows a flow chart of a control method 400 according to further another embodiment of this disclosure. As shown in FIG. 4, another aspect of the disclosure relates to a control method 400. The control method 400 is configured to control the position limiting device. The position limiting device includes a magnetic element and a detecting element. The control method includes the steps as below:

Step 410: detecting the magnetic field generated by the magnetic element, and correspondingly generating and transmitting a magnetic field intensity signal by the detecting element;

Step 420: receiving and processing the magnetic field intensity signal to obtain a magnetic field intensity value;

Step 430: comparing the magnetic field intensity value and a magnetic field intensity boundary value;

Step 440: driving the detecting element to move related to the magnetic element when the magnetic field intensity value is smaller than the magnetic field intensity boundary value; and Step 450: stopping the detecting element continued moving when the magnetic field intensity value is equal to the magnetic field intensity boundary value.

In order to readily understand the control method 400 in this disclosure, the following embodiments are illustrated with reference to the FIG. 1, 2, 4. In step 410, the magnetic field generated by the magnetic element 110 is detected through the detecting element 120, and a magnetic field intensity signal is correspondingly generated and transmitted.

In step 420, the magnetic field intensity signal is received and processed by the controller 140 to obtain a magnetic field intensity value. The step of comparing the magnetic field intensity value and a magnetic field intensity boundary value in step 430 is implemented by the controller 140.

Then, in step 440, when the magnetic field intensity value is smaller than the magnetic field intensity boundary value, the detecting element 120 moves related to the magnetic element 110 by the driving of the motor 130. The camera lens 150 or the engine 160 moves as well. Referring to step 450, when the magnetic field intensity value is equal to the magnetic field intensity boundary value, the operation of the motor 130 is stopped by the controller 140 so that the detecting element 120 stops moving. Then, the camera lens 150 or the engine 160 stops moving as well.

Accordingly, comparing with the conventional technology, a conventional boundary position limiting device is configured with two position limiting switches or electrodes on every axis, the position limiting device in the embodiment of this disclosure is only configured with a magnetic element 110 and a detecting element 120. Relatively, the wires inside the position limiting device in the embodiment of this disclosure are simpler so that the maintenance becomes easier. Besides, the object of controlling the camera lens 150 and the engine 160 not exceeding the boundaries is accomplished as well.

In one embodiment, the magnetic element 110 shown in FIG. 1 and FIG. 2 includes the first end 112 and the second end 114. The control method 400 further includes the following step.

The detecting element 120 is driven to correspondingly move from the first end 112 to the second end 114 to perform the correction of the rotation number boundary value. When the correction of the rotation number boundary value is performed, a rotation number of the motor 130 is read and a rotation number boundary value is calculated from the rotation number.

During this step, the motor 130 is driven by the controller 140 so that the detecting element 120 moves by the driving of the motor 130. Furthermore, the rotation number of the motor 130 is read by the controller 140, and the rotation number boundary value is calculated from the rotation number.

If the magnetic element 110 is lost or the detecting element 120 is out of function or damaged so that the magnetic field intensity signal is unable to be received. At this time, the rotation number of the motor 130 is read, and the rotation number and the rotation number boundary value are compared. When the rotation number is larger than or equal to the rotation number boundary value, the operation of the motor 130 is stopped so that the detecting element 120 is stopped moving. Then, the move of the camera lens 150 or the engine 160 is stopped as well. In this step, the steps of reading, comparing and stopping may be accomplished by the controller 140 shown in FIG. 1 or FIG. 2.

As illustrated above, since the detecting element 120 may correspondingly move to the first end 112 or the second end 114 of the magnetic element 110, the position limiting device may have two boundaries and respectively set two boundary values. In other words, the rotation number boundary values may include the first rotation number boundary value and the second rotation number boundary value. Furthermore, the correction of rotation number boundary value includes the correction of the first rotation number boundary value and the correction of the second rotation number boundary value. When the detecting element 120 moves from the first end 112 to the second end 114, the rotation number of the motor 130 is read and the first rotation number boundary value is calculated from the rotation number. In this step, the steps of reading and calculating may be accomplished by the controller 140 shown in FIG. 1 or FIG. 2.

If the magnetic element 110 is lost or the detecting element 120 is out of function or damaged, the magnetic field intensity signal is unable to be received. At this time, the rotation number of the motor 130 is read, and the rotation number and the first rotation number boundary value are compared. The direction from the first end 112 to the second end 114 is defined as a first direction. When the detecting element 120 correspondingly moves from the center of the position limiting device along the first direction, and the rotation number is larger than or equal to the first rotation number boundary value, the move of the detecting element 120 along the first direction is stopped. In this step, the step of stopping may be accomplished by the controller 140.

Besides, when the detecting element 120 correspondingly moves from the second end 114 to the first end 112, the rotation number of the motor 130 is read, and the second rotation number boundary value is calculated from the rotation number. In this step, the steps of reading and calculating may be accomplished by the controller 140 shown in FIG. 1 or FIG. 2.

Similarly, if the magnetic element 110 is lost or the detecting element 120 is out of function or damaged, the magnetic field intensity signal is unable to be received. At this time, the rotation number of the motor 130 is read, and the rotation number and the second rotation number boundary value are compared. The direction from the second end 114 to the first end 112 is defined as a second direction. When the detecting element 120 correspondingly moves from the center of the position limiting device along the second direction, and the rotation number is larger than or equal to the second rotation number boundary value, the move of the detecting element 120 along the second direction is stopped. In this step, the steps of reading, comparing and stopping may be accomplished by the controller 140 shown in FIG. 1 or FIG. 2.

Since the motor 130 may be worn after operated for a period of time, if the rotation number boundary value obtained from the correction of the rotation number boundary value is still in use, the rotation number boundary value may become inaccurate. Therefore, after the correction of the rotation number boundary value is performed, the rotation number boundary value can be updated in real time through a mechanism. The mechanism is described as below. When the detecting element 120 moves from the center of the position limiting device related to the magnetic element 110, and the magnetic field intensity value is equal to the magnetic field intensity boundary value, the rotation number boundary value is reset according to the rotation number of the motor 130.

Since the user may not be aware of the operation status of the position limiting device, a display mechanism is provided in this disclosure to provide the user the operation status of the position limiting device. The mechanism is described as follows. The rotation number signal is outputted to the external screen (not shown) according to the rotation number of the motor 130, so that the detecting element 120 is displayed in a relative position of the position limiting device on the external screen.

The control method illustrated above may be implemented by software, hardware and/or firmware. For example, if speed and accuracy of operation are major considerations, hardware and/or firmware may be chosen to implement the control method. If flexibility of the design is major consideration, software by be chosen to implement the control method. Alternatively, software, hardware and firmware may be simultaneously used. It should be understood that the description of the embodiments above does not imply the priority therebetween, and is not intended to limit the scope of this invention. The person skilled in the art may make any flexible design depending on the requirement.

Furthermore, the person with ordinary knowledge in the art should understand that in order to readily realizing the technology of this disclosure, the steps in the control method are named according to the functions thereof, and not intended to limit the steps. Any steps may be combined to a step or divided to several steps, or a step may be changed to another step to operate. These changes should be in the embodiments of this disclosure.

According to the embodiment of the disclosure described above, applying the disclosure has the following advantages. In the embodiment of the disclosure, the position limiting device and the control method 400 are provided to improve the issue in the prior art, that is, a traditional position limiting device is configured with two position limiting switches or electrodes on every axis. It results in the wires inside the moving module being complicated. Besides, in the embodiment of this disclosure, a position limiting device and a control method 400 are provided to improve the issues which the boundary position limiting device is out of function and the motor is unable to accurately drive the moving module, owing to the failure or damage of the position limiting switches or the electrodes of the boundary position limiting device.

Although the specific embodiments are disclosed above, they are not intended to limit the disclosure. It will be apparent to those skilled in the art that various modifications and variations can be made to the structure of the present disclosure without departing from the scope or spirit of the disclosure. In view of the forgoing, it is intended that the present disclosure cover modifications and variations of this disclosure provided they fall within the scope of the following claims.

What is claimed is:
1. A position limiting device, comprising:
a magnetic element disposed in the center of the position limiting device, wherein the magnetic element has a first end and a second end to define a first magnetic field intensity boundary value and a second magnetic field intensity boundary value respectively, wherein the first end and the second end have different magnetic poles;
a detecting element configured to detect a magnetic field generated by the magnetic element, and correspondingly generate and transmit a magnetic field intensity signal;
a motor coupled to the detecting element and configured to drive the detecting element to move; and
a controller electrically coupled to the detecting element and the motor and configured to receive and process the magnetic field intensity signal to obtain a magnetic field intensity value, wherein the controller compares the magnetic field intensity value with the first magnetic field intensity boundary value or the second magnetic field intensity boundary value, when the magnetic field intensity value is smaller than the first magnetic field intensity boundary value or the second magnetic field intensity boundary value, the controller drives the motor and the detecting element moves related to the magnetic element by the motor, and when the magnetic field intensity value is equal to the first magnetic field intensity boundary value or the second magnetic field intensity boundary value, the controller stops the operation of the motor so that the detecting element stops moving.

2. The position limiting device of claim 1, wherein the controller is further configured to control the motor, the detecting element is correspondingly moved from the first end to the second end by the motor to perform a correction of rotation number boundary value, wherein when the correction of rotation number boundary value is performed, the rotation number of the motor is read by the controller, and a rotation number boundary value is calculated from the rotation number.

3. The position limiting device of claim 2, wherein when the controller is unable to receive the magnetic field intensity signal, the controller reads the rotation number of the motor, and compares the rotation number and the rotation number boundary value, and when the rotation number is equal to or larger than the rotation number boundary value, the controller stops the operation of the motor so that the detecting element stops moving.

4. The position limiting device of claim 2, wherein the rotation number boundary value comprises a first rotation number boundary value and a second rotation number boundary value, the correction of rotation number boundary value comprises a correction of the first rotation number boundary value and a correction of the second rotation number boundary value;
wherein when the detecting element is correspondingly moved from the first end to the second end, the controller reads the rotation number of the motor, and the first rotation number boundary value is calculated from the rotation number.

5. The position limiting device of claim 4, wherein when the controller is unable to receive the magnetic field intensity signal, the controller reads the rotation number of the motor, and compares the rotation number and the first rotation number boundary value, wherein the direction from the first end to the second end is defined as a first direction, and when the detecting element is correspondingly moved from the center of the position limiting device along the first direction, and the rotation number is equal to or larger than the first rotation number boundary value, the controller stops the operation of the motor so that the detecting element stops moving.

6. The position limiting device of claim 4, wherein when the detecting element is correspondingly moved from the second end to the first end, the controller reads the rotation number of the motor, and the second rotation number boundary value is calculated from the rotation number.

7. The position limiting device of claim 6, wherein when the controller is unable to receive the magnetic field intensity signal, the controller reads the rotation number of the motor, and compares the rotation number and the second rotation number boundary value, wherein the direction from the second end to the first end is defined as a second direction, and when the detecting element is correspondingly moved from the center of the position limiting device along the second direction and the rotation number is equal to or larger than the second rotation number boundary value, the controller stops the operation of the motor so that the detecting element stops moving.

8. The position limiting device of claim 2, wherein after the correction of the rotation number boundary value is performed, and when the detecting element moves from the center of the position limiting device related to the magnetic element, and the magnetic field intensity value is equal to the first magnetic field intensity boundary value or the second magnetic field intensity boundary value, the controller resets the rotation number boundary value according to the rotation number of the motor read by the controller.

9. The position limiting device of claim 2, wherein the controller is further configured to output a rotation number signal to an external screen according to the rotation number of the motor read by the controller, so that the detecting element is displayed in a relative position of the position limiting device on the external screen.

10. The position limiting device of claim 2, wherein the rotation number boundary value is the rotation number.

11. The position limiting device of claim 2, wherein the rotation number boundary value is the difference between the rotation number and a predetermined rotation number.

12. A control method configured to control a position limiting device, wherein the position limiting device comprises a magnetic element and a detecting element, and the magnetic element is disposed in the center of the position limiting device, wherein the control method comprises:
detecting a magnetic field generated from the magnetic element, and correspondingly generating and transmitting a magnetic field intensity signal by the detecting element, wherein the magnetic element has a first end and a second end to define a first magnetic field intensity boundary value and a second magnetic field intensity boundary value respectively, wherein the first end and the second end have different magnetic poles;
receiving and processing the magnetic field intensity signal to obtain a magnetic field intensity value;
comparing the magnetic field intensity value and the first magnetic field intensity boundary value or the second magnetic field intensity boundary value;
driving the detecting element to move related to the magnetic element when the magnetic field intensity value is smaller than the first magnetic field intensity boundary value or the second magnetic field intensity boundary value; and
stopping the detecting element continued moving when the magnetic field intensity value is equal to the first magnetic field intensity boundary value or the second magnetic field intensity boundary value.

13. The control method of claim 12, wherein the control method further comprises:
driving the detecting element to correspondingly move from the first end to the second end to perform a correction of the rotation number boundary value, wherein when the correction of the rotation number boundary value is performed, a rotation number of the motor is read and a rotation number boundary value is calculated from the rotation number.

14. The control method of claim 13, wherein when the magnetic field intensity signal is unable to be received, the rotation number of the motor is read and the rotation number and the rotation number boundary value are compared, and when the rotation number is equal to or larger than the rotation number boundary value, the detecting element is stopped moving.

15. The control method of claim 13, wherein the rotation number boundary value comprises a first rotation number boundary value and a second rotation number boundary value, and the correction of the rotation number boundary value comprises a correction of the first rotation number boundary value and a correction of the second rotation number boundary value;
wherein when the detecting element is correspondingly moved from the first end to the second end, the rotation number of the motor is read, and the first rotation number boundary value is calculated from the rotation number.

16. The control method of claim 15, wherein when the magnetic field intensity signal is unable to be received, the rotation number of the motor is read, and the rotation number and the first rotation number boundary value are compared, wherein the direction from the first end to the second end is defined as a first direction, and when the detecting element is correspondingly moved from the center of the position limiting device along the first direction, and the rotation number is equal to or larger than the first rotation number boundary value, the detecting element is stopped moving along the first direction.

17. The control method of claim 15, wherein when the detecting element is correspondingly moved from the second end to the first end, the rotation number of the motor is read, and the second rotation number boundary value is calculated from the rotation number.

18. The control method of claim 17, wherein when the magnetic field intensity signal is unable to be received, the rotation number of the motor is read, and the rotation number and the second rotation number boundary value are compared, wherein the direction from the second end to the first end is defined as a second direction, and when the detecting element is correspondingly moved from the center of the position limiting device along the second direction, and the rotation number is equal to or larger than the second rotation number boundary value, the detecting element is stopped moving along the second direction.

19. The control method of claim 13, wherein after the correction of the rotation number boundary value is performed, and when the detecting element moves from the center of the position limiting device related to the magnetic element, and the magnetic field intensity value is equal to the first magnetic field intensity boundary value or the second magnetic field intensity boundary value, the rotation number boundary value is reset according to the rotation number of the motor read by the controller.

20. The control method of claim 13, further comprising:
outputting a rotation number signal to an external screen according to the rotation number of the motor read by the controller, so that the detecting element is displayed in a relative position of the position limiting device on the external screen.

* * * * *